United States Patent
Yan et al.

(10) Patent No.: US 12,045,117 B2
(45) Date of Patent: Jul. 23, 2024

(54) DETECTING AND MITIGATING CROSS-LAYER IMPACT OF CHANGE EVENTS ON A CLOUD COMPUTING SYSTEM

(71) Applicant: Microsoft Technology Licensing, LLC, Redmond, WA (US)

(72) Inventors: Xiaohan Yan, Sammamish, WA (US); Ken Hsieh, Kirkland, WA (US); Murali Mohan Chintalapati, Bellevue, WA (US); Yingnong Dang, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 24 days.

(21) Appl. No.: 17/900,640

(22) Filed: Aug. 31, 2022

(65) Prior Publication Data

US 2024/0069999 A1 Feb. 29, 2024

(51) Int. Cl.
*G06F 11/00* (2006.01)
*G06F 11/07* (2006.01)

(52) U.S. Cl.
CPC ........ *G06F 11/0712* (2013.01); *G06F 11/076* (2013.01); *G06F 11/0793* (2013.01)

(58) Field of Classification Search
CPC .......................... G06F 11/076; G06F 11/0712
See application file for complete search history.

(56) References Cited

U.S. PATENT DOCUMENTS

| | | | | |
|---|---|---|---|---|
| 9,256,412 | B2 * | 2/2016 | Genevski | G06F 8/60 |
| 9,558,093 | B2 * | 1/2017 | Sadovsky | G06F 11/0772 |
| 10,001,986 | B1 * | 6/2018 | De Gaetano | G06F 8/658 |
| 10,769,641 | B2 * | 9/2020 | Ranganna | H04L 41/5096 |

(Continued)

FOREIGN PATENT DOCUMENTS

WO 2016160381 A1 10/2016

OTHER PUBLICATIONS

"International Search Report and Written Opinion Issued in PCT Application No. PCT/US23/028300", Mailed Date: Oct. 23, 2023, 14 Pages.

*Primary Examiner* — Amine Riad
(74) *Attorney, Agent, or Firm* — Ray, Quinney & Nebeker; James S. Bullough (57) ABSTRACT

The present disclosure relates to systems, methods, and computer-readable media for identifying anomalies of failure events on a cloud computing system and determining cross-component and cross-layer correlation between change events that occur on the cloud computing system and the failure events associated with the anomalies. In particular, this disclosure describes a system that receives telemetry related to change events and failure events across any number of computing layers of a distributed computing environment (e.g., a cloud computing system) and detects anomalies based on counts of failure events that are manifested over discrete periods of time. Based on these detected anomalies, the anomaly correlation system can determine cross-layer and cross-component correlations between selective change events and the detected anomalies of failure (Continued)

events. The anomaly correlation system may further generate and provide recommendations related to mitigating or otherwise addressing the anomalies based on the determined correlations.

20 Claims, 6 Drawing Sheets

(56) References Cited

U.S. PATENT DOCUMENTS

| | | | |
|---|---|---|---|
| 10,956,307 B2* | 3/2021 | Isaak | G06F 11/3672 |
| 11,775,277 B2* | 10/2023 | Xue | G06F 11/3452 |
| | | | 717/170 |
| 11,797,416 B2* | 10/2023 | Kulkarni | G06F 11/3668 |
| 2015/0347264 A1* | 12/2015 | Mohammed | G06F 9/45558 |
| | | | 714/45 |
| 2017/0132057 A1* | 5/2017 | Zhang | G06F 11/008 |
| 2017/0300370 A1 | 10/2017 | Chafle et al. | |
| 2018/0316591 A1* | 11/2018 | Ashwood-Smith | H04L 43/14 |
| 2020/0159607 A1* | 5/2020 | Piaseczny | G06F 11/3438 |
| 2021/0311813 A1* | 10/2021 | Wang | G06F 11/0772 |
| 2022/0027249 A1 | 1/2022 | Dua et al. | |
| 2022/0156134 A1 | 5/2022 | Lehmann et al. | |

* cited by examiner

DETECTING AND MITIGATING CROSS-LAYER IMPACT OF CHANGE EVENTS ON A CLOUD COMPUTING SYSTEM

BACKGROUND

A cloud computing system refers to a collection of computing devices capable of providing remote services and resources. For example, modern cloud computing infrastructures often include a collection of physical server devices organized in a hierarchical structure including computing regions, computing zones, node clusters, virtual local area networks (VLANs), racks, fault domains, etc. Cloud computing systems often make use of different types of virtual services (e.g., computing containers, virtual machines) that provide remote storage and computing functionality to various clients or customers. These virtual services can be hosted by server nodes on a cloud computing system.

As cloud computing continues to grow in popularity, managing different types of services and providing adequate cloud-based resources to customers has become increasingly difficult. Indeed, as cloud infrastructure become more complex and interconnected, implementing changes at different components can have an impact on other components, even across different hierarchical layers of the cloud computing system. For example, applying an update or other change to a virtual service may manifest as a failure on another virtual service or across multiple services. As a result of the complexity and interconnected nature of the cloud-based services, it can become very difficult to determine whether a particular action is the cause of negative impacts across the cloud.

Conventionally, negative impacts are avoided by conducting various testing methods. For example, many conventional systems may simulate a distributed computing environment and the effect of performing various actions thereon. These approaches, however, often oversimplify the computing environment and fail to provide an accurate estimation of whether a particular change will cause a negative impact. Other conventional systems may conduct user testing, such as beta testing, by applying a change to a small portion of the cloud computing system to test an impact of the change. While this approach often provides accurate results with regard to failure statistics and impact, it often takes a significant amount of time to conduct sufficient testing and can have a negative impact on a select few clients of the cloud computing system.

These and other difficulties exist in connection with accurately determining impact of changes on a cloud computing environment.

DETAILED DESCRIPTION

The present disclosure is generally related features and functionality of an anomaly correlation system that is capable of determining correlations between change events and failure anomalies that occur (or otherwise manifest) on components of a cloud computing system across multiple computing layers of the cloud computing system. In particular, this disclosure describes a system that receives telemetry related to change events and failure events across any number of computing layers of a distributed computing environment (e.g., a cloud computing system) and detects anomalies based on counts of failure events that are manifested over discrete periods of time. Based on these detected anomalies, the anomaly correlation system can determine cross-layer and cross-component correlations between selective change events and the detected anomalies of failure events. The anomaly correlation system may further generate and provide recommendations related to mitigating or otherwise addressing the anomalies based on the determined correlations.

As an illustrative example, and as will be discussed in further detail below, an anomaly correlation system may receive a plurality of change event identifiers associated with change events that occur across multiple computing layers (e.g., regions, zones, clusters, racks) of a cloud computing system. The anomaly correlation system may also maintain a record of failure events across the multiple computing layers that include batch entries indicating counts of failure events over discrete periods of time. The anomaly correlation system may identify failure anomalies within the record of failure events based on one or more counts of the detected failures exceeding threshold counts of failures over the discrete periods of time. The anomaly correlation system may selectively analyze ranges of change events of the identified discrete duration(s) of time to determine correlations between the change events and the detected anomalies. The anomaly correlation system may provide a recommendation or perform other mitigation actions based on the determined correlations.

The present disclosure includes a number of practical applications that provide benefits and/or solve problems associated with determining system-wide correlations between change events and failure events, particularly where the different events occur across different cloud components that are implemented on different computing layers of the cloud computing system. Some non-limiting examples of these applications and benefits are discussed in further detail below.

For example, by maintaining system-wide reports of change events and failure events, the anomaly correlation system can determine correlations between events and failures that are tracked and reported independent from one another across the cloud computing system. Indeed, where change events and failure events are often tracked and detected by different components, the anomaly correlation system provides features and functionality that facilitate correlating these independently tracked events. Moreover, even where the change events and corresponding failure events occur across different components and across different computing layers, the anomaly correlation system maintains system-wide records, thus enabling the anomaly correlation system to determine correlation across components and across computing layers of the cloud computing system.

In addition to generally tracking and maintaining a record of the various events, the anomaly correlation system maintains counts of failure events over discrete periods of time to facilitate identification of isolated anomalies. In particular, and as will be discussed in further detail below, the anomaly correlation system can maintain batch entries indicating counts of failure events over brief durations of time to determine time-periods over which certain failure events are occurring at abnormally high rates. This tracking of counts over certain batches of time enables the anomaly correlation system to isolate time-periods over which certain failures are happening, thus providing a guide for the anomaly correlation system to analyze corresponding change events.

Indeed, by isolating time periods over which anomalies of failure events are occurring, the anomaly correlation system can significantly reduce the amount of processing expense associated with analyzing the change events and determining correlations between specific change events and the specific types of failure events. This isolation of time ranges enables the anomaly correlation system to evaluate a wider variety of change events with respect to detected failure events to determine a many-to-many correlation which would otherwise require massive computing capacity to accurately determine. This is particularly relevant in modern cloud computing systems where millions of operations are being performed across the cloud every day and where operations performed with respect to one component may have an impact on components across multiple layers of the cloud computing system.

As illustrated in the foregoing discussion, the present disclosure utilizes a variety of terms to describe features and advantages of the systems described herein. Additional detail is now provided regarding the meaning of some example terms.

For example, as used herein, a "cloud computing system" refers to a network of connected devices that provide various services to clients (e.g., cloud clients, client devices, network devices). A cloud computing system may refer more generally to a distributed computing system that includes a collection of physical computing devices (e.g., server nodes) organized in a hierarchical structure. This hierarchical structure may include regions, zones, clusters, racks, or other groupings of server nodes (e.g., virtual local area networks, fault domains). While one or more embodiments described herein refer specifically to an anomaly correlation system implemented on a cloud computing system, features described herein with respect to determining correlations of events on a cloud computing system may similarly apply more generally to other distributed computing system having multiple computing layers. The cloud computing system may refer to a private or public cloud computing system.

As used herein, a "change event" may refer to an instance of a defined actions by a cloud component on the cloud computing system. In particular, a change event may refer to any instance of an event or action by a particular component based on a listing of known actions that the various component(s) are configured to perform on a cloud computing platform. In one or more embodiments described herein, a change action refers to an update, such as an update of a microservice (or instance of a microservice) on a component for which computing resources have been allocated. Other examples may include deployment of services, downgrades of services, reboots of services, or any other changes implemented by a cloud component of the cloud computing system.

As used herein, a "failure event" or "fail event" may refer to a tracked instance of failure that manifests or is otherwise detected on a cloud component. Similar to the change event, the failure event may refer to any of a wide variety of events that have been defined and are recognizable by a cloud computing component on the cloud computing system. For example, a failure event may be associated with a fail code based on detection of an event corresponding to the fail code. Example failure events include "out of capacity," "virtual machine (VM) does not exist," "Internal network failure," and any of a wide variety of failure types that the cloud computing system is configured to detect (e.g., any failure type for which a corresponding fail code exists). In one or more embodiments, failure events refer to instances of long latency, such as when performance of one or more cloud components or portions of the cloud computing system have measured latency that falls outside a percentile range (e.g., $99^{th}$ percentile) over a measured time period (e.g., from a time period and location pivot). In one or more embodiments, a failure event refers to a tracked instance in which a change event is not carried out with a failure identifier referring to a fail code or other identifier of the change event. In one or more embodiments, the detected fail code is tracked independently from the change events and are generated independent from one another (e.g., by different cloud components that detect the respective event-types).

As used herein, a "cloud component" refers to a service (e.g., a microservice) or unit that is configured to process data and provide outputs in accordance with the component configuration(s). Cloud components may be implemented as services on server nodes of the cloud computing system. In one or more embodiments described herein, a cloud component refers to a compute resource manager (CRM) that creates and manages computing resources across different computing layers of the cloud computing system and which tracks a large class of change events. In one or more embodiments, a cloud component refers to a compute resource provider (CRP) that processes requests from clients and other services, such as requests for allocating computing resources and other actions. In each of the above examples, a change event may refer to an action performed by the corresponding cloud component or a cloud component on which a change event is performed (e.g., a rollout or an update on a target cloud component)

As used herein, a "failure anomaly" or simply "anomaly" refers to a set of failure events that exceeds an expected range or number of failure events over some period of time. For example, a failure anomaly may refer to a detected count of failure events of an associated failure-type that is greater than a threshold number of failure events. The failure anomaly may be determined based on a set of factors associated with the failure type, a duration of time over which the failure events are detected, and/or a computing location of the detected failures.

As used herein, a "computing layer" refers to a location or level within a distributed computing hierarchy. For example, as will be discussed in further detail herein, a computing layer may refer vertical levels of a distributed computing hierarchy, such as a region of computing devices (e.g., a datacenter or set of datacenters) that includes multiple computing zones that each include multiple node clusters. As another example, computing layers may refer to horizontal divisions in a computing hierarchy, such a first computing layer referring to a first computing zone and a second computing layer referring to a second computing zone that are each associated with the same computing region. As used in one or more embodiments described herein, a computing location may refer to a specific computing layer within a hierarchy of a distributed computing network. Additional examples of computing layers will be discussed in further detail in connection with FIGS. 1-2. As noted above, the anomaly correlation system may detect and correlate event changes and failure events across different computing layers including combinations of vertical and horizontal computing layers.

Figure 1:
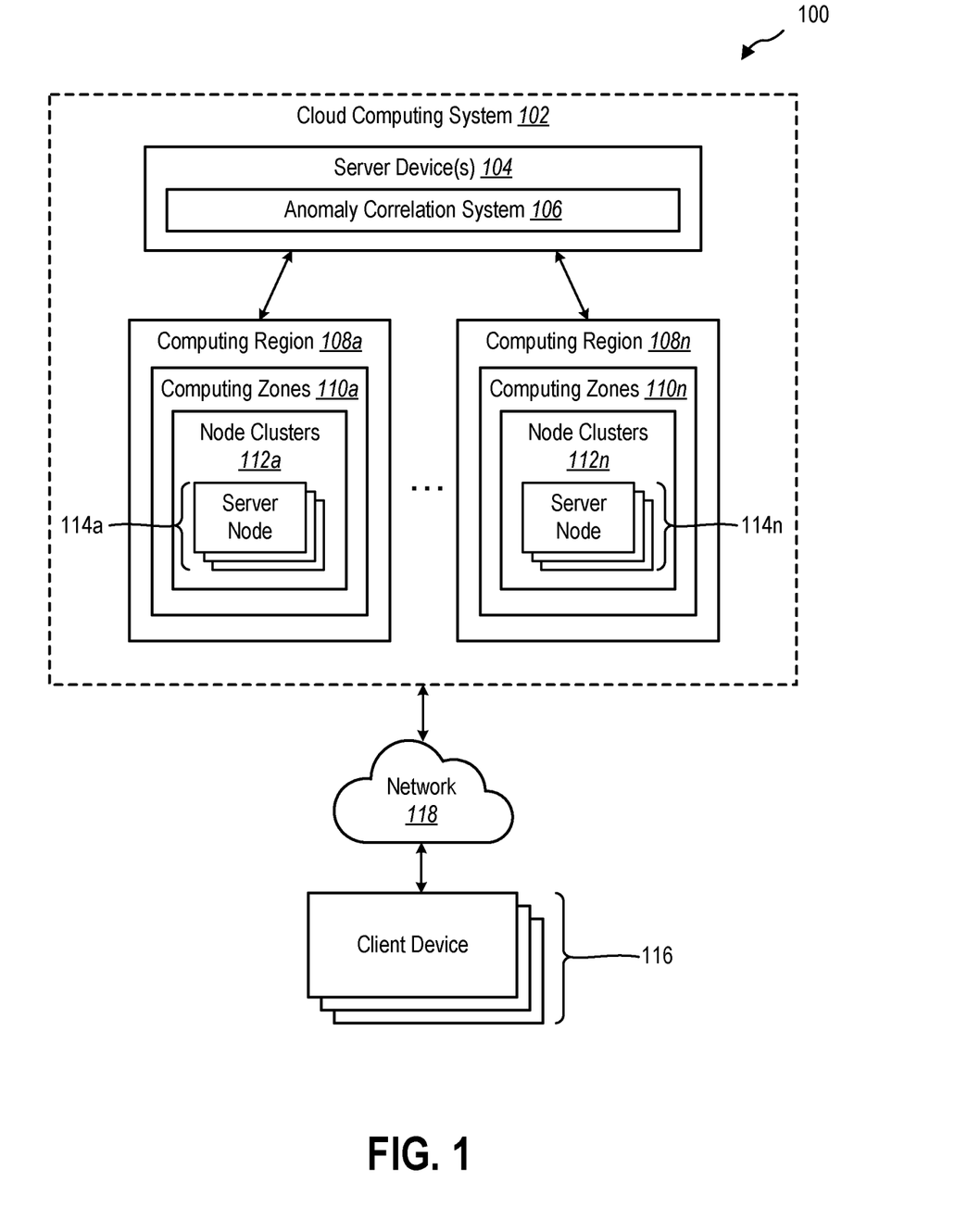
FIG. 1 illustrates an example environment of a cloud computing system including an anomaly correlation system implemented on a server device of the cloud computing system.

Additional detail will now be provided regarding systems described herein in relation to illustrative figures portraying example implementations. For example, FIG. 1 illustrates an example environment 100 including a cloud computing system 102. The cloud computing system 102 may include any number of devices. For example, as shown in FIG. 1, the cloud computing system 102 may include one or more server device(s) 104 having an anomaly correlation system 106 implemented thereon. As will be discussed in further detail below, the anomaly correlation system 106 may provide features and functionalities related to maintaining records of change events and failure events and selectively analyzing the respective records to determine correlations between various change events and co-occurring failure events.

In addition to the server device(s) 104, the cloud computing system 102 may include a hierarchy of server nodes and other network devices that make up a plurality of computing layers of the cloud computing system 102. For example, as shown in FIG. 1, the cloud computing system 102 may include a plurality of computing regions 108a-n. The computing regions 108a-n may be categorized or otherwise grouped by geographic location. For example, a first computing region 108a may be associated with a first geographic region (e.g., U.S. West, U.S. East) while other regions are associated with different locations. In one or more embodiments, the computing regions 108a-n refer to datacenters of the cloud computing system 102.

As further shown, each of the computing regions 108a-n may have lower computing layers under the computing regions 108a-n. For example, the first computing region 108a may include computing zones 110a that collectively make up the first computing region 108a. The computing zones 110a may additionally include any number of node clusters 112a, which may include a plurality of server nodes 114a. Other implementations may include additional or fewer layers of granularity. For example, a computing zone could include multiple discrete groupings of node clusters that are part of different horizontal computing layers that make up the computing zone while each including multiple node clusters. As another example, a node cluster may include a plurality of server racks at a computing layer between the node cluster and the specific groupings of server nodes of the respective server racks. As shown in FIG. 1, each of the computing regions 108a-n may include similar layers of computing zones 110a-n, node clusters 112a-n, and server nodes 114a-n.

As will be discussed in further detail herein, the cloud computing system 102 may include any number and variety of server nodes having different numbers and types of compute cores implemented thereon. The cloud components (e.g., virtual machines, microservices) may be implemented on the compute cores of the respective server nodes. Different cloud components may occupy different quantities of compute cores. Moreover, while not shown in FIG. 1, each of the server nodes may include agents (e.g., software agents) implemented thereon that are capable of locally tracking and providing telemetry regarding detected change events and/or failure events that occur on the various cloud components.

As shown in FIG. 1, the environment 100 may include a plurality of client devices 116 in communication with the cloud computing system 102 (e.g., in communication with different server nodes 114a-n). The client devices 116 may refer to various types of computing devices including, by way of example, mobile devices, desktop computers, server devices, Internet of Things (IoT) devices, edge network devices, or any other type of computing device capable of communicating with components on the cloud computing system 102 via a network 118. The network 118 may include one or multiple networks that use one or more communication platforms or technologies for transmitting data. For example, the network 118 may include the Internet or other data link that enables transport of electronic data between respective client devices 116 and devices (e.g., server nodes 114a-n) of the cloud computing system 102.

Figure 2:
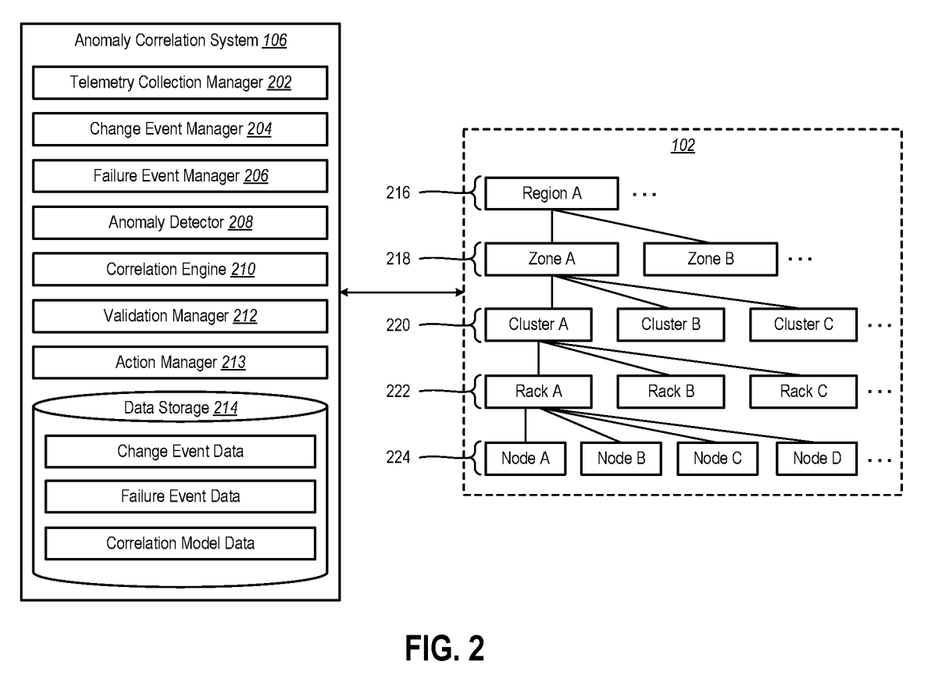
FIG. 2 illustrates a more detailed implementation of the anomaly correlation system in accordance with one or more embodiments.

Additional detail in connection with an example implementation of the anomaly correlation system 106 will be discussed in reference to FIG. 2. Features described below in connection with respective components of the anomaly correlation system 106 shown in FIG. 2 may be applied to other implementations described herein. In addition, while FIG. 2 shows components of an anomaly correlation system 106 implemented on a single system or device, one or more of the components or individual features of the anomaly correlation system 106 may be implemented on one or across multiple computing devices (e.g., server devices). In one or more embodiments, the anomaly correlation system 106 is implemented as a central system that services any number server nodes implemented across multiple regions of the cloud computing system 102.

As shown in FIG. 2, the anomaly correlation system 106 may include a telemetry collection manager 202. The telemetry collection manager 202 may receive event data and failure data tracked by cloud components implemented on respective devices on the cloud computing system 102. For example, in one or more embodiments, each of the server nodes include tracking agents thereon that locally generate or track telemetry and provide said telemetry (e.g., event data, failure data) to the anomaly correlation system 106. In one or more implementations, the telemetry collection manager 202 maintains communication with and queries the cloud components to collect telemetry of the respective cloud components.

As further shown in FIG. 2, the anomaly correlation system 106 may include a change event manager 204. Upon collecting the telemetry data, the change event manager 204 may maintain a record of change events including change event identifiers received from the various cloud components. The change event identifiers may include any information about the tracked change events. By way of example, the change event identifiers may include an identifier of a component, a computing location of the component (e.g., layer and/or sub-layer(s) identifier(s)), an identifier of the type of change event (e.g., change event type identifier), and any other information associated with the change event. Additional information associated with the record of change events and the change event identifiers will be discussed below.

As further shown in FIG. 2, the anomaly correlation system 106 may include a failure event manager 206. Based on the collected telemetry, the failure event manager 206 may maintain a record of failure events that are detected by cloud components of the cloud computing system. It will be appreciated that cloud components may self-diagnose various failure events. Alternatively, in one or more embodiments, services may be deployed on the cloud computing system 102 that are configured to detect or otherwise track instances of failure events. In tracking and maintaining a record of failure events, the failure event manager 206 may receive or otherwise obtain failure event identifiers that provide information about the associated failure event. By way of example, a failure event identifier may include an identifier of a component (e.g., the component on which the failure occurred and/or the component that detected the failure), a computing location of the detected failure event, an identifier of a type of event (e.g., a failure code), and any information associated with the failure event. Additional information associated with the record of failure events will be discussed below.

As noted above, the change event manager 204 and the failure event manager 206 may maintain separate records of the detected events based on telemetry signals that are received from cloud components on the cloud computing system 102. Indeed, as will be discussed in further detail below, the change event identifiers and the failure event identifiers may include no reference to one another such that the change events and potentially associated failure events would not be associated based on information contained within the respective event identifiers (e.g., change event identifiers, failure event identifiers). Thus, while the anomaly correlation system 106 may include telemetry including a mix of both change event identifiers and failure event identifiers, associating the event identifiers of different types would be difficult to associate without further features provided by one or more of the additional components 208-213 of the anomaly correlation system 106.

As shown in FIG. 2, the anomaly correlation system 106 may include an anomaly detector 208. The anomaly detector 208 may evaluate the record of failure events to determine anomalies that exist in the detected failure events. As will be discussed in further detail below, the anomaly detector 208 may track anomalies by batching or otherwise associating instances of failure events within discrete periods of time and determining whether the batches of failure events satisfy an anomaly threshold. In one or more embodiments, the anomaly detector 208 compares counts of the associated instances to determine if the count(s) exceed a threshold count of failure events for the corresponding period of time. In one or more embodiments, the anomaly detector 208 detects batches or specific instances of long latency that fall outside of a prescribed range of tracked latency performance over a period of time. Indeed, an anomaly may be characterized as an instance of long latency that extends beyond a threshold period of time or as a count of instances of long latency that exceeds a threshold count. Additional information in connection with detecting or otherwise identifying anomalies will be discussed below.

As further shown in FIG. 2, the anomaly correlation system 106 includes a correlation engine 210. Upon identifying an anomaly and corresponding set of change event identifiers, the correlation engine 210 may analyze the change event identifiers to determine one or more correlations (e.g., predicted or estimated correlations) between the change events and failure anomaly (or between specific features of the events). For example, the correlation engine 210 may determine a relevant computing location (e.g., region, zone, cluster, rack) of the relevant change event associated with the location(s) of the failure events. The correlation engine 210 may also determine a correlation between cloud components of the change events and corresponding failure events. Other correlations may involve identifying change event types that appear or are predicted to be causing the failure events.

The correlation engine 210 may determine the correlations in a variety of ways and based on a variety of factors. In one or more embodiments, the correlation engine 210 may simply apply one or more algorithms to a set of change event identifiers and associated failure event identifiers to determine which features of the change event identifiers correspond to the failure events of a detected failure anomaly. Other implementations may involve training and/or implementing a trained model (e.g., a machine learning model) to the set of event identifiers and associated failure identifiers to determine correlations between the respective sets of data. Additional information in connection with determining and/or predicting event correlations will be discussed below.

As shown in FIG. 2, the anomaly correlation system 106 may optionally include a validation manager 212. Upon identifying the anomaly and/or a correlation between the event identifier(s) and failure identifier(s), the validation manager 212 may validate the anomaly and associated events by determining whether the failure event already has a built-in fix on the cloud computing system 102. For example, where a cloud component has a built-in remedy for a failure event, the validation manager 212 may determine that determining the correlation and addressing the anomaly of failure events would be unnecessary as the failure event already has a built-in solution within the infrastructure of the cloud computing system 102. Additional information in connection with validating anomalies and/or correlations will be discussed below.

As shown in FIG. 2, the anomaly correlation system 106 may include an action manager 213. The action manager 213 may determine when and how to indicate which change events are suspected of causing failure anomalies on the cloud computing system 102. For example, based on identifying an anomaly, determining a correlation, and validating the anomaly/correlation, the action manager 213 may generate an action indicator (e.g., an alert or other action instructions) and transmit the alert to a particular region, computing zone, or cloud component of the cloud computing system 102 associated with the change event(s). The action indicator may include any information associated with the correlation including, by way of example, an identification of the change event type causing (e.g., predicted to be causing) the failure events, a computing location of the change event as well as a location of the failure anomalies, and any other information that would be helpful in troubleshooting the cause of the various failure events. Additional information in connection with generating and providing action indicators will be discussed below.

As shown in FIG. 2, the anomaly correlation system 106 may include or have access to a local and/or remote data storage 214. The data storage 214 may provide access to a variety of different types of data that one or more of the components 202-213 may access in performing respective functions discussed herein. While FIG. 2 shows an example set of data types, the data storage 214 may include other types of data. Moreover, one or more of the respective data types may be accessible across multiple devices and need not be implemented on the same system, as shown in FIG. 2.

As shown in FIG. 2, the data storage 214 may include change event data. The change event data may include any information associated with change events that are be tracked or otherwise identifiable by the anomaly correlation system 106. For example, the change event data may include fields that make up a change event identifier. In one or more embodiments, the change event data includes codes or other identifiers of change event types that are recognizable or otherwise tracked by cloud components on the cloud computing system 102. The change event data may include any information from a record of change events that is maintained by a change event manager 204.

As further shown in FIG. 2, the data storage 214 may include failure event data. The failure event data may include any information associated with failure events that is tracked or otherwise identifiable by the anomaly correlation system 106. For example, the failure event data may include fields of a record of failure events. In one or more embodiments, the failure event data includes any information from a record of failure events including failure codes, discrete time ranges, counts of failures, etc. In one or more embodiments, the failure event data may include thresholds of failure events that constitute anomalies.

As further shown in FIG. 2, the data storage 214 may include correlation model data. The correlation model data may include any information used by components of the anomaly correlation system 106 in determining correlations between failure events and change events for a particular period of time. For example, the correlation model data may include a machine learning model including any parameters, inputs, or other model data that may be applied to a set of inputs (e.g., event identifiers) to determine or otherwise predict correlations between change event identifiers (or particular signals of the respective identifiers) and the batch of failure events.

As discussed above, and as shown in FIG. 2, the anomaly correlation system 106 may track change events and failure events and determine correlations between the events across multiple computing layers of the cloud computing system 102. As noted above, this cross-component and cross-layer correlation is facilitated by identifying anomalies that are localized to specific durations of time and computing layer and isolating analysis of the correlation between specific ranges of change event identifiers that are determined to be associated with the failure anomaly (e.g., based on the change events occurring within a specific time frame). This selective analysis provides an ability of the anomaly correlation system 106 to accurately predict correlations between change events and failure events without expending as significant a quantity of computing resources as would be required without isolating the subset of relevant change events predicted to be causing the anomaly.

FIG. 2 further illustrates an example vertical hierarchy of the cloud computing system 102 in accordance with one or more embodiments described herein. As shown in FIG. 1, a first layer 216 may refer to a region layer including a plurality of regions. Below a first region (denoted as "Region A"), a second layer 218 may refer to a set of computing zones that collectively make up the first region. Below a first zone (denoted as "Zone A") of the first region, a third layer 220 may refer to a set of node clusters that collectively make up the first zone of the first region. Below a first node cluster (denoted as "Cluster A"), a fourth layer 222 may refer to a set of server racks that collectively make up the first cluster of the first zone of the first region. Below a first server rack (denoted as "Rack A"), a fifth layer 224 may refer to a set of server nodes or host nodes that collectively make up the first rack of the first cluster of the first zone of the first region.

As will be discussed in further detail below, the event identifiers may include specific computing locations indicating vertical and/or horizontal layers of the cloud computing system 102. Moreover, as discussed in one or more embodiments herein, the anomaly correlation system 106 may determine correlations between change events and failure events that occur and manifest across different computing layers (e.g., different vertical layers and/or horizontal layers).

Figure 3:
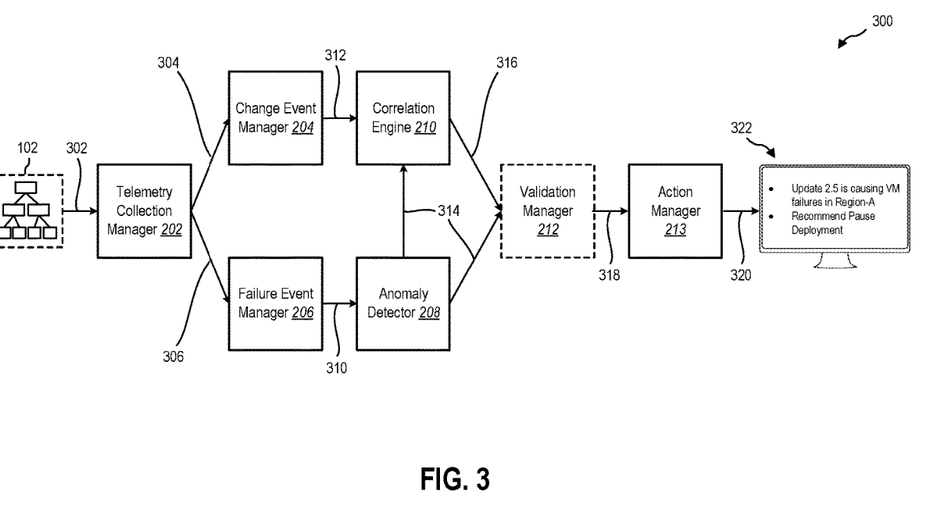
FIG. 3 illustrates an example implementation of the anomaly correlation system in determining a correlation between a change event and a detected anomaly in accordance with one or more embodiments.

FIG. 3 provides additional information in connection with components of the anomaly correlation system 106. In particular, FIG. 3 illustrates an example workflow 300 showing an example implementation of the anomaly correlation system 106 discussed above in connection with FIG. 2. It will be appreciated that each of the components shown in FIG. 3 may include similar features and functionality as discussed above in connection with FIG. 2. Further detail will now be discussed in connection with the workflow 300.

As shown in FIG. 3, a distributed architecture of cloud components on the cloud computing system 102 may provide telemetry data 302 to a telemetry collection manager 202. As noted above, the telemetry data 302 may be locally collected by the cloud components and compiled or otherwise routed to additional components of the anomaly correlation system 106 via the telemetry collection manager 202. As will be discussed below the telemetry data 302 may include a combination of data associated with different events (e.g., change events, failure events) that are tracked by the respective cloud components.

As shown in FIG. 3, upon receiving the telemetry data 302, the telemetry collection manager 202 may provide change event identifiers 304 to the change event manager 204. As noted above, the change event identifiers 304 may include any number of data fields indicating information about the respective change events tracked by the cloud components. As further shown in FIG. 3, the telemetry collection manager 202 may provide failure event identifiers 306 to the failure event manager 206. As noted above, the failure event identifiers 306 may include any number of data fields indicating information about the respective failure events tracked by the cloud components.

As shown in FIG. 3, the respective event managers 204-206 may maintain event records for the different types of events. For example, the failure event manager 206 may generate or otherwise maintain a failure event record 310 including a collection of failure event identifiers over a predetermined period of time (e.g., having timestamps that range over a predetermined period of time). The failure event record 310 may include a table of entries (e.g., batch entries) including information about types of failure events and associated counts of those failure events over discrete periods of time (e.g., batches of time). The failure event manager 206 may maintain counts of failure event types over discrete batches of time with respect to specific computing locations. In one or more embodiments, the failure event manager 206 can track measured latencies for one or more cloud components over some period of time, which may be used to detect or otherwise identify instances of long latency. Additional detail in connection with an example failure event record 310 will be discussed below in connection with FIG. 4. As shown in FIG. 3, the failure event manager 206 may provide the failure event record 310 to the anomaly detector 208 for further processing.

As further shown in FIG. 3, the change event manager 204 may generate or otherwise maintain a change event record 312 including a collection of change event identifiers over some predetermined period of time (e.g., having timestamps that range over the predetermined period of time). The change event record 312 may include a record or log of entries indicating any number of change events that have been received at the telemetry collection manager 202 and compiled within the change event record 312.

Each entry of the change event record 312 may include an indication of the change event type, a time of the change event, a cloud component that initiated or processed the change event, and a computing location of the change event. Additional detail in connection with an example change event record 312 will be discussed below in connection with FIG. 4. As shown in FIG. 3, the change event manager 204 may provide the change event record 312 to the correlation engine 210 for further processing.

As shown in FIG. 3, the anomaly detector 208 may detect or otherwise identify whether an anomaly exists within the failure event record 310. As noted above, an anomaly may refer to an event where a count of a corresponding failure type over a discrete or predetermined period of time (e.g., a batch of time) exceeds a threshold count of detected failures. The threshold may be any value that is determined to be indicative of a higher than normal or potentially worrisome number of failure events of a particular failure type. In one or more embodiments, the anomaly detector 208 may detect an anomaly of long latency, such as an instance of long latency based on measured latency for a particular cloud component or other portion of the cloud computing system 102 that falls outside of a prescribed latency range. In this example, the threshold may refer to a period of time and/or threshold percentile over which the measured latency falls out of a defined range (e.g., high latency measured at $99^{th}$ percentile exceeding a threshold period of time that would be considered expected or normal latency).

The threshold that the count(s) is compared against may be determined in a number of ways and based on a number of factors. For example, in one or more embodiments, the threshold is a fixed count that is higher than an average or expected number of failures for a given time period. In one or more embodiments, the threshold is some percentage of a normal or expected count of failures. In one or more implementations described herein, the threshold count refers to a sigma value referring to a threshold number of standard deviations from an average or other metric of variation from an average, median, or other count of failures considered to a normal or expected count of failures.

The threshold count of failure events for a given time period may vary between different failure types, between different regions, and over different periods of time (e.g., different ranges of timestamps). For example, where a first failure type is more prevalent than a second failure type, the threshold count of failures may be considerably higher for the first failure type based on a wider range or number of expected failures for the first failure type compared to the second failure type. As another example, where a first computing location (e.g., a first computing zone) hosts services that experience a certain type of failure more often than a second computing location (e.g., a second computing zone), the threshold count may be higher for the first computing location. As another example, threshold counts may be different depending on the time of day, day of the week, or other variability or seasonal differences that occurs between different time periods. Indeed, in one or more embodiments, the threshold count is determined based on a combination of failure type, computing location, and time periods based on historical values of failure events that are observed over time.

As shown in FIG. 3, the anomaly detector 208 may identify anomalies that occur on the cloud computing system 102, which may be based on comparing counts of failure events with corresponding thresholds. Upon detecting the anomalies, the anomaly detector 208 may provide anomaly data 314 to the correlation engine 210 for further processing. As further shown in FIG. 3, the anomaly detector 208 may provide the anomaly data 314 to the validation manager 212.

Upon receiving the change event record 312 and anomaly data 314, the correlation engine 210 may determine correlations between detected anomalies and change events from the change event record 312. For example, the correlation engine 210 may apply a correlation model (e.g., algorithms and/or machine learning model) to the anomaly data 314 and change event record 312 to determine which change events are correlated to the failure events associated with the detected anomaly.

As noted above, the correlation engine 210 may selectively apply correlation logic to a subset of change event entries of the change event record 312 based on a time range and/or computing layer associated with the detected anomaly. For instance, where an anomaly refers to an entry of the failure event record 310 that spans over a ten minute period, the correlation engine 210 may exclusively consider change events from the change event record 312 within the ten minute period. In one or more embodiments, the correlation engine 210 may consider other change events (e.g., outside the specific range), but with a lower weight applied by the correlation engine in determining correlations between event instances.

As an illustrative example, some failure events may take several hours to manifest after a change event that is determined to be correlated with the failure event(s). In this example, the correlation engine 210 may employ a correlation algorithm that utilizes a time decay metric that considers failure events that occur outside a particular time range, but nonetheless allows the correlation engine 210 to consider relationships between change events and failure events that occur outside a narrow range of time. This may be applicable in a variety of scenarios, such as a change event that takes multiple hours to complete (e.g., deployment of an update across a region).

The correlation engine 210 may determine a variety of correlation metrics between the change events and the failure events. For example, the correlation engine 210 may determine a simple correlation based on ratios or frequency of failure events relative to instances of change events that occur during a relevant period of time. In this example, the correlation engine 210 may determine a particular type of change event that is most likely causing or otherwise contributing to occurrence of the failure events of the detected anomaly. In one or more embodiments, the correlation engine 210 determines a metric of impact, which may include information obtained from entries of the failure event record 310.

As noted above, the correlation may refer specifically to cross-component and/or cross-layer correlations. For example, in one or more implementations, the change event (s) that is causing or contributing to the failure event instances of the anomaly may occur on a first layer while the failure events are occurring on a second (or other different layer) from the change events. This may be vertical correlation between vertical layers of the cloud computing system 102 (e.g., change events at regional level may be contributing to failure events at a cluster level). In addition, or as an alternative, this relationship may refer to horizontal correlation between horizontal layers of the cloud computing system 102 (e.g., change events at a zone level may be contributing to failure events within a different zone in the same or a different region).

As another example, a correlation may refer to a cross-component correlation, such as where a first cloud component (e.g., an NRP) deploying a new version introduces a bug that manifests as a spiked fault count of network operation errors on a second cloud component of a different component-type (e.g., a CRP). In this example, the first and second cloud components may both be on a similar computing layer (e.g., a region layer), but nonetheless be determined to be associated with a cross-component correlation in accordance with one or more embodiments described herein.

The correlation engine 210 and the anomaly detector 208 may provide the anomaly data 314 and correlation data 316 to the validation manager 212 for validation. As noted above, the validation manager 212 may validate the correlations (e.g., the signals of the change event record 312 that are determined to be correlated with the anomalies) by determining whether the determined correlation is a correlation that is already known or has a built-in mitigation mechanism in place on the cloud computing system 102. For example, the validation manager 212 may determine whether the correlation is already known (e.g., based on a known causation between a particular change event and failure event) and/or whether there is a built-in mechanism in place for dealing with the failure event type of the associated failure anomaly.

The validation manager 212 provides a benefit to the anomaly correlation system 106 by decreasing a number of failure events to be mitigating by way of the action manager 213 of the anomaly correlation system 106. For example, where the validation manager 212 determines that the determined correlation is not validated (e.g., that the failure events have already been fixed or have a built-in procedure to fixing), the anomaly correlation system 106 may simply drop the anomaly indication and proceed to further process incoming telemetry data without taking any specific action with respect to the identified anomaly. This can reduce expense of processing power in attempting to fix potential issues that do not need to be fixed. In addition, where the validation manager 212 is applied to the anomaly data prior to the correlation engine 210, the validation manager 212 may reduce processing expense by decreasing the number of entries that need to be processed by the correlation engine 210.

As shown in FIG. 3, the validation manager 212 can provide validation correlation data 318 to the action manager 213. As discussed above, the action manager 213 may generate action data 320 indicating information associated with the change event and corresponding failure anomaly. In one or more embodiments, the action data 320 may include an indication of one or more change event entries from the change event record 312 in addition to failure event entries from the failure event record 310. In one or more embodiments, the action data 320 includes an indication of one or more recommended actions that may be performed by a component on the cloud computing system 102 to mitigate future instances of the failure events. In one or more embodiments, the action data 320 may simply include an indication of the change event identifier and/or failure event identifiers as well as information from the identifiers that are relevant to the identified anomaly (e.g., the evidence of the anomaly and correlation based on the analysis of the correlation engine 210.

As shown in FIG. 3, the action manager 213 may provide action data 320 to a computing device 322 for providing a display of some or all of the action data 320. As shown in FIG. 3, the action data may include an indication of a change event (e.g., update 2.5) as well as the failure event that caused or is predicted to be causing the failure events associated with the anomaly (e.g., causing VM failures). The action data may further include an identification of a computing location (e.g., Region A). The action data may include any evidence in support of the determined correlation. As shown in FIG. 3, the action data may include one or more recommended actions. By way of example, the recommended action may include a recommendation to pause deployment, collect additional data to determine an impact of the anomaly (e.g., by collecting further telemetry data outside of the time range of the anomaly), or any other mitigation action that could be performed to reduce occurrence or impact of the failure events.

Figure 4:
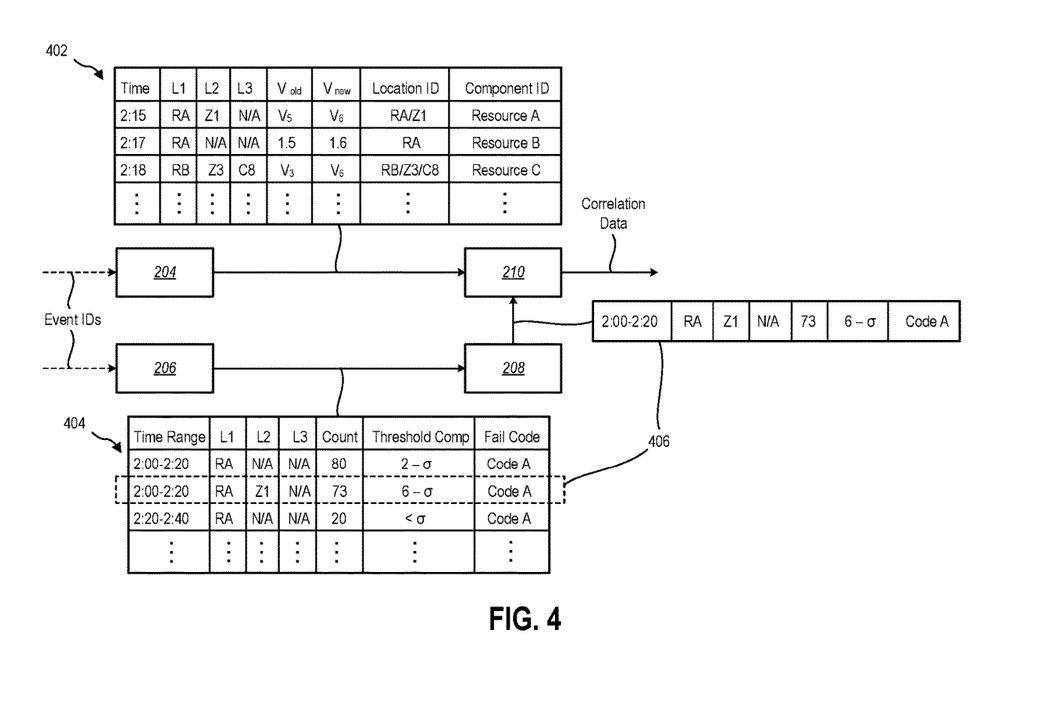
FIG. 4 illustrates an example implementation of a portion of the anomaly correction system in connection with generating change event and failure event records and providing portions of the event record data to a correlation engine.

Turning now to FIG. 4, additional information is provided in connection with an example portion of the workflow discussed above in connection with FIG. 3. In particular, FIG. 4 illustrates an example implementation in which components of the anomaly correlation system 106 generate the change event record and failure event record and how data from the records is used to detect anomalies and determine correlations between the change event data and the failure event data.

As shown in FIG. 4, the change event manager 204 may receive event identifiers (e.g., change event identifiers) from cloud components distributed across multiple layers of the cloud computing system 102. Based on the received identifiers, the change event manager 204 may generate a change event record 402 that includes a record or compilation of the change event identifiers received from the cloud components. The change event record 402 may include any number of change events observed or otherwise tracked by the cloud components. Moreover, the change event record 402 may include a record of change events over a short or long period of time (e.g., depending on storage constraints, service configurations, or policy data related to maintaining change event record data).

As shown in FIG. 4, the change event record 402 may include any number of change event entries corresponding to instances of change events. For example, each row of the change event record 402 may represent a change event identifier received from a cloud component which may refer to a single instance of a change event observed by the cloud component.

As further shown, the change event record 402 may include a number of fields that are represented in some or all of the change event entries. For example, as shown in FIG. 4, each entry of the change event record 402 may include a time field indicating a time when the change event was tracked and/or added to the change event record 402. The change event record 402 may additionally include one or more location fields indicating a computing location within a hierarchy of the cloud computing system. The change event record 402 may further include an old and new field indicating a previous state and a current state of the cloud component or other target of the change event. The change event record 402 may further include a location identifier (ID) field, which may refer to a concatenation of locations of the cloud component (e.g., a concatenation of the location field(s)). The change event record 402 may further include a cloud component identifier (ID) field indicating identifiers of the cloud component (e.g., a resource identifier, such as a service or microservice identifier).

As a first example, the change event record 402 includes a first entry including some or all of these fields. The first entry may refer to a first change event observed or tracked at 2:15 at a computing location of a first region and first computing zone. Other location fields may be left blank based on an assigned or determined location of the cloud component. Indeed, in one or more embodiments, the entry of the change event record 402 may include as granular of location data as is available for the identified change event. The first entry may additionally include an indication of a change event from "V5" to "V6" indicating the change event as an upgrade from version 5 (V5) to version 6 (V6) of the cloud component. Finally, the first entry may include a location identifier for the cloud component, which in this case refers to a concatenation of location data for the cloud component on which the change event occurred. The first entry may also include a component ID (Resource A) indicating a type of cloud component (e.g., a type of service or microservice) represented in the first entry. The change event record 402 includes other example entries including similar fields as the first entry, as illustrated in FIG. 4.

As further shown in FIG. 4, the failure event manager 206 may receive event identifiers (e.g., failure event identifiers) from cloud components distributed across multiple layers of the cloud computing system 102. Based on the received identifiers, the failure event manager 206 may generate a failure event record 404 that includes a record of counts associated with various failure event types. More specifically, the failure event manager 206 may maintain a failure event record 404 that includes entries showing counts of detected failure events of specific event types over corresponding ranges of time and, in some cases, at specific computing locations.

Similar to the change event record 402, the failure event record 404 may include any number of entries associated with different counts of failure events observed over corresponding ranges of time. For example, as shown in FIG. 4, each row of the failure event record 404 may represent a count of instances of a specific type of failure event for a corresponding time range (e.g., a range of twenty minutes). In one or more embodiments, the rows may further be divided into counts of failure instances over a time period at corresponding computing locations.

As shown in FIG. 4, each entry of the failure event record 404 may include a plurality of fields that provide information about the respective count of failure events. For instance, in the example shown in FIG. 4, each entry may include an indicated time range. The time range may differ in other implementations. Further, even within the same failure event record 404, different failure types or locations may have different counts corresponding to shorter or longer durations of time. As further shown, the failure event record 404 may include one or more location fields indicating computing locations of cloud components that detected the failure events (or cloud components on which the failure events occurred). The failure event record 404 may additionally include location indicators for the respective entries as well as a count of the failure instances detected by the cloud component(s). As further shown, the entries of the failure event record 404 may include comparison data showing a comparison of the count of failures relative to a sigma value (or other threshold). The entries may further include a fail code or other identifier of the failure event type.

As a first illustrative example, a first entry of the failure event record 404 includes a time range of 2:00-2:20 indicating that the count of failures is for the corresponding range of time. The first entry additionally includes an indication of Region A. Other locations may be left blank based on the Region A computing location being the highest available granularity for the failure event type. Alternatively, the first entry may simply be one of several entries showing instances of the failure event over different layers of the cloud computing system 102. Indeed, as shown in FIG. 4, the failure event record 404 includes multiple entries showing counts of the same type of failure event over the same range of time at different locations. This indication of counts across variable computing layers provides an indication of a locality of a certain proportion of the failure events. This may be used by the correlation engine 210 in determining a specific location or component(s) that may be causing the failure and/or where the failure events are having a highest level of impact.

As shown in FIG. 4, the first entry may additionally include a count of failure events that have been detected for the corresponding computing location. In this example, the failure event record 404 includes an indication that eighty (80) counts of an associated failure type have been observed for the computing location covered by Region A. The first entry may further include a comparison between the count and an expected count or an indication of whether the count exceeds some threshold. In this example, the first entry indicates that the count of eighty is 2-$\sigma$, or two standard deviations from a normal amount of failure events that the anomaly detector 208 is expected to see. As further shown, the first entry may additionally include a fail code identifying the type of failure event.

As noted above, the failure event record 404 may include multiple entries associated with a specific type of failure and time range. In this example, the failure event record 404 includes a first entry indicating a count of failures for a first region (Region A) while a second entry indicates a count of failures for the first region at a first zone (Region A, Zone 1). Other entries may indicate counts at other locations within the broader computing zone of Region A. While the first entry may indicate that the count of failure events exceeds some threshold value, the anomaly detector 208 may nonetheless zone in on the second entry, which shows a much higher count of failure event instances relative to an expected count of failure event instances. Indeed, the anomaly detector 208 may determine that while the first entry includes a count that exceeds a threshold, the anomaly is better represented within the second entry of the failure event record 404 based on the count of failure events for the same event type and over the same time period being so much higher than the relevant threshold.

As shown in FIG. 4, the anomaly detector may selectively identify an entry (or multiple entries) from the failure event record 404 to send to the correlation engine 210 for further processing. In this example, the anomaly detector 208 identifies the second entry 406 of the failure event record 404 to provide as an input to the correlation engine 210. As discussed above, the correlation engine 210 may consider this information to identify a subset of entries from the change event record 402 to consider in determining correlations between change events and failure events referenced by the corresponding event records 402, 404.

As noted above, this correlation can be performed even where the respective event records are collected and maintained independent from one another. For example, in one or more embodiments, the entries of the change event record 402 may include entries that do not recommend any of the failure instances represented within the failure event record 404. Moreover, the failure event record 404 may include entries that have no references to any of the change events represented within the change event record 402. Thus, by isolating specific portions of the event records and providing those select portions to the correlation engine 210, the correlation engine 210 may determine correlations without considering all possible combinations of change events and failure events. Indeed, in accordance with one or more embodiments described herein, the correlation engine may apply any of a variety of algorithms and/or models to the limited subsets of data from the respective records to isolate correlations between the tracked change events and failure events observed by cloud components across multiple computing layers of a complex cloud computing system 102.

Figure 5:
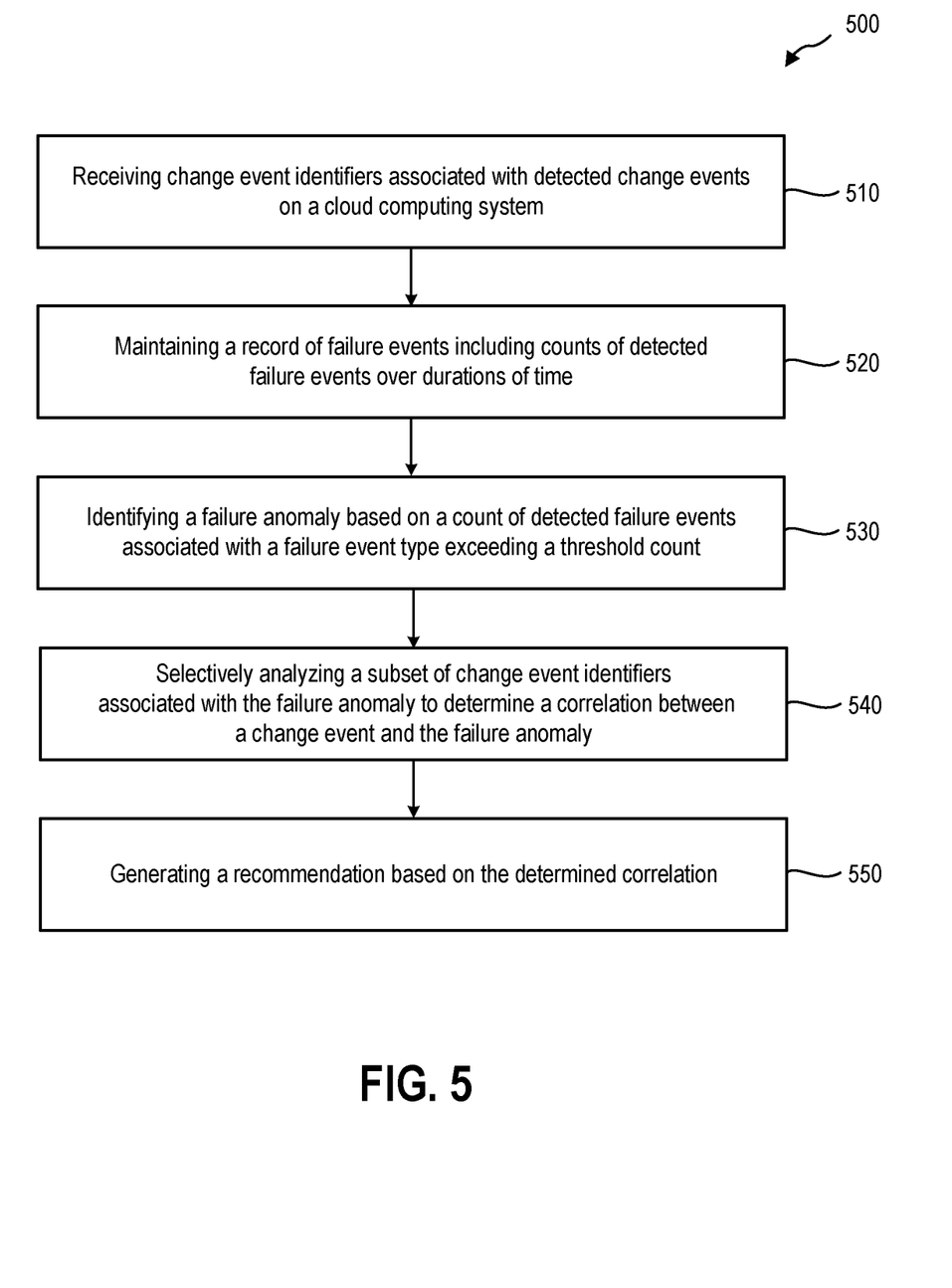
FIG. 5 illustrates an example series of acts for detecting an anomaly and determining a correlation between a change event and the anomaly in accordance with one or more embodiments.

Turning now to FIG. 5, this figure illustrates an example flowchart including a series of acts for identifying a failure anomaly and determining correlations between change events and instances of failure events associated with the failure anomaly. While FIG. 5 illustrates acts according to one or more embodiments, alternative embodiments may omit, add to, reorder, and/or modify any of the acts shown in FIG. 5. The acts of FIG. 5 can be performed as part of a method. Alternatively, a non-transitory computer-readable medium can include instructions that, when executed by one or more processors, cause a computing device (e.g., a server device) to perform the acts of FIG. 5. In still further embodiments, a system can perform the acts of FIG. 5.

For example, FIG. 5 illustrates a series of acts 500 for identifying a failure anomaly and determining correlations between change events and instances of failure events associated with the failure anomaly. As shown in FIG. 5, the series of acts 500 includes an act 510 of receiving change event identifiers associated with detected change events on a cloud computing system. In one or more embodiments, the act 510 includes receiving a plurality of change event identifiers associated with a plurality of change events across multiple computing layers of a cloud computing system. In one or more embodiments, the act 510 includes receiving a plurality of change event identifiers associated with a plurality of change events across multiple computing layers of a distributed computing system.

In one or more embodiments, the plurality of change events include a plurality of component upgrades on cloud components implemented across the multiple computing layers of the cloud computing system. Further, in one or more embodiments, the multiple computing layers include two different layers of a hierarchy of computing layers, which may include two or more of a computing region, a computing zone, a node cluster, a server rack, and a server node.

As further shown in FIG. 5, the series of acts 500 includes an act 520 of maintaining a record of failure events including counts (or other indicators) of detected failure events over durations of time. In one or more embodiments, the act 520 includes maintaining a record of failure events across the multiple computing layers of the cloud computing system, the record of failure events including batch entries indicating counts of detected failure events over durations of time. As noted above, the record of failure events may include instances of long latency events indicating periods over which performance of the cloud component(s) falls below a threshold performance metric. In one or more embodiments, the act 520 includes maintaining a record of failure events across a first computing layer and a second computing layer of a distributed computing system, the record of failure events including batch entries indicating counts of detected failure events over durations of time.

As further shown in FIG. 5, the series of acts 500 includes an act 530 of identifying a failure anomaly based on a count of detected failure events associated with a failure event type exceeding a threshold count. In one or more embodiments, the act 530 includes identifying a failure anomaly within the record of failure events based on a count of detected failure events from a batch entry exceeding a threshold count of failure events of an associated failure event type over a duration of time. In one or more embodiments, the failure anomaly may be based on a length of a duration of time over which performance falls below some threshold level (e.g., a long-latency event). In one or more embodiments, the act 530 includes identifying a failure anomaly within the record of failure events based on a count of detected failure events from a batch entry exceeding a threshold count of failure events of an associated failure event type over a duration of time.

As shown in FIG. 5, the series of acts 500 includes an act 540 of selectively analyzing a subset of change event identifiers associated with the failure anomaly to determine a correlation between a change event and the failure anomaly. In one or more embodiments, the act 540 includes selectively analyzing a subset of change event identifiers from the plurality of change event identifiers over the duration of time associated with the failure anomaly to determine a correlation between at least one change event and the failure anomaly. In one or more embodiments, the act 540 includes selectively analyzing a subset of change event identifiers from the plurality of change event identifiers over the duration of time associated with the failure anomaly to determine a correlation between at least one change event and the failure anomaly.

As further shown in FIG. 5, the series of acts 500 includes an act 550 of generating a recommendation based on the determined correlation. In one or more embodiments, the act 550 includes generating a recommendation based on the determined correlation between the at least one change event and the failure anomaly. In one or more embodiments, the act 550 includes generating a recommendation based on the determined correlation between the at least one change event and the failure anomaly.

In one or more embodiments, a change event identifier from the plurality of change event identifiers includes an identification of a change event detected by a cloud component of the cloud computing system and an indication of a layer from the multiple computing layers where the cloud component is implemented on the cloud computing system. In one or more embodiments, the record of batch entries includes a table of rows corresponding to the batch entries, each row from the table including a failure identifier and a count of failure events associated with the failure identifier over a given duration of time. In one or more embodiments, each row further includes an identifier of a layer from the multiple computing layers to which the failure event is associated.

In one or more embodiments, the threshold count is a threshold sigma value indicating a threshold standard deviation relative to an expected count of failures for the associated failure event. In one or more embodiments, the expected count of failures is based on a combination of the failure type and a computing layer associated with the count of failures from the batch entry.

In one or more embodiments, the series of acts 500 additionally includes validating the anomaly by determining that the cloud computing system does not have an existing system configured to mitigate the detected failure events associated with the failure anomaly independent from the recommendation. In one or more embodiments, generating the recommendation is based on validating the anomaly.

In one or more embodiments, the at least one change event and the failure anomaly are each associated with respective components implemented across different computing layers of the cloud computing system. In one or more embodiments, the recommendation includes an identification of one or more change events predicted to cause a plurality of detected failures associated with the batch entry having the count of failures exceeding the threshold count of failures.

Figure 6:
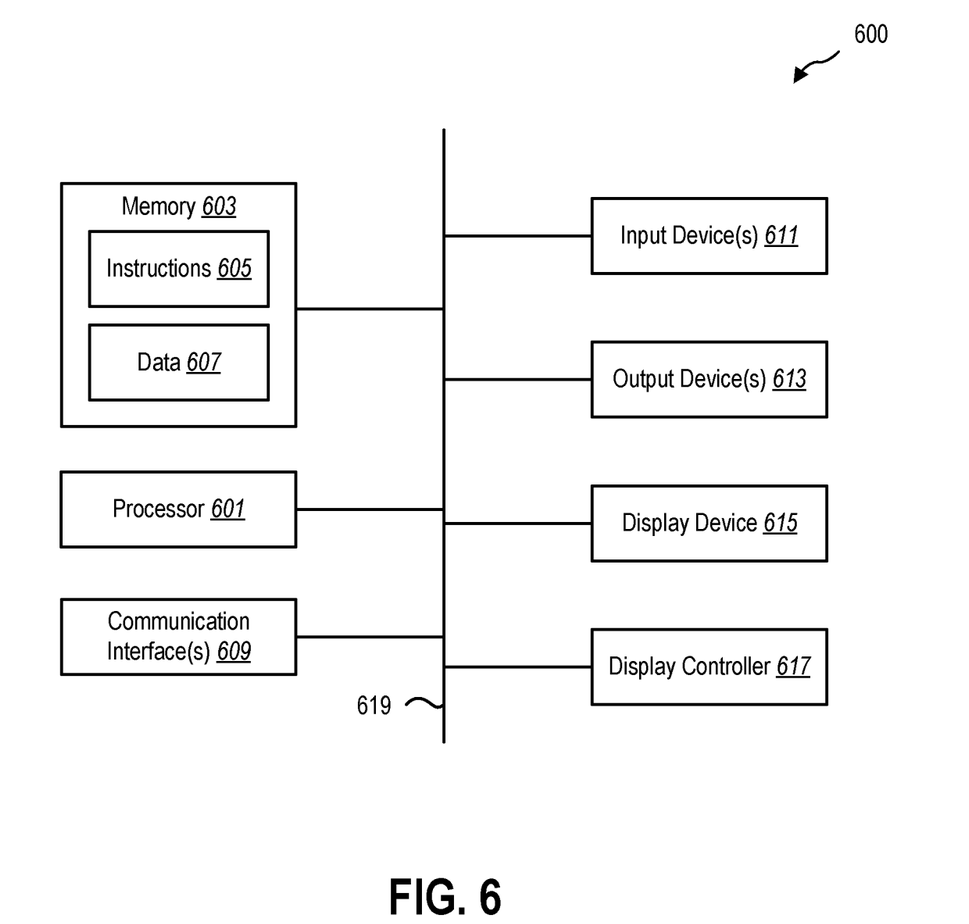
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   receiving a plurality of change event identifiers associated with a plurality of change events detected across multiple hierarchical layers of a hierarchical structure of a cloud computing system;
   maintaining a record of failure events across the multiple hierarchical layers of the cloud computing system, the record of failure events including batch entries indicating counts of detected failure events over durations of time;
   identifying a failure anomaly within the record of failure events based on a count of detected failure events from a batch entry exceeding a threshold count of failure events of an associated failure event type over a duration of time;
   selectively analyzing a subset of change event identifiers from the plurality of change event identifiers over the duration of time associated with the failure anomaly to determine a correlation between at least one change event and the failure anomaly, the subset of change event identifiers being associated with change events detected across at least two of the multiple hierarchical layers of the hierarchical structure of the cloud computing system; and
   generating a recommendation based on the determined correlation between the at least one change event and the failure anomaly.

2. The method of claim 1, wherein the plurality of change events include a plurality of component upgrades on cloud components implemented across the multiple hierarchical layers of the cloud computing system.

3. The method of claim 1, wherein the multiple hierarchical layers include two different computing locations, the two different computing locations including two or more of:
   a computing region;
   a computing zone;
   a node cluster;
   a server rack; and
   a server node.

4. The method of claim 1, wherein a change event identifier from the plurality of change event identifiers includes an identification of a change event detected by a cloud component of the cloud computing system and an indication of a layer from the multiple hierarchical layers where the cloud component is implemented on the cloud computing system.

5. The method of claim 1, wherein the batch entry is maintained within a record of batch entries, the record of batch entries including a table of rows corresponding to the batch entries, each row from the table including a failure identifier and a count of failure events associated with the failure identifier over a given duration of time.

6. The method of claim 5, wherein each row further includes an identifier of a layer from the multiple hierarchical layers to which the failure event is associated.

7. The method of claim 1, wherein the threshold count is a threshold sigma value indicating a threshold standard deviation relative to an expected count of failures for the associated failure event.

8. The method of claim 7, wherein the expected count of failures is based on a combination of the failure type and a computing layer associated with the count of failures from the batch entry.

9. The method of claim 1, further comprising validating the failure anomaly by determining whether the cloud computing system has a built-in solution within the infrastructure of the cloud computing system to mitigate the detected failure events associated with the failure anomaly.

10. The method of claim 9, wherein generating the recommendation is based on determining whether the cloud computing system has the built-in solution within the infrastructure of the cloud computing system.

11. The method of claim 1, wherein the at least one change event and the failure anomaly are each associated with respective components implemented across different computing layers of the cloud computing system.

12. The method of claim 1, wherein the recommendation includes an identification of one or more change events predicted to cause a plurality of detected failures associated with the batch entry having the count of failures exceeding the threshold count of failures.

13. A method, comprising:
    receiving a plurality of change event identifiers associated with a plurality of change events detected across multiple hierarchical layers of a hierarchical structure of a distributed computing system;
    maintaining a record of failure events across a first hierarchical layer and a second hierarchical layer of the hierarchical structure of the distributed computing system, the record of failure events including batch entries indicating counts of detected failure events over durations of time;
    identifying a failure anomaly within the record of failure events based on a count of detected failure events from a batch entry exceeding a threshold count of failure events of an associated failure event type over a duration of time;
    selectively analyzing a subset of change event identifiers from the plurality of change event identifiers over the duration of time associated with the failure anomaly to determine a correlation between at least one change event and the failure anomaly, the subset of change event identifiers being associated with change events detected across the first hierarchical layer and the second hierarchical layer of the hierarchical structure of the distributed computing system; and
    generating a recommendation based on the determined correlation between the at least one change event and the failure anomaly.

14. The method of claim 13, wherein the first hierarchical layer and the second hierarchical layer are implemented across different computing locations of the distributed computing system, the different computing locations including two or more of:
    a computing region;
    a computing zone;
    a node cluster;
    a server rack; and
    a server node.

15. The method of claim 13, wherein the threshold count is a threshold sigma value indicating a threshold standard deviation relative to an expected count of failures for the associated failure event.

16. The method of claim 13, further comprising validating the failure anomaly by determining whether the distributed computing system has a built-in solution within the infrastructure of the distributed computing system to mitigate the detected failure events associated with the failure anomaly, wherein generating the recommendation is based on determining whether the distributed computing system has the built-in solution within the infrastructure of the distributed computing system.

17. A system, comprising:
  at least one processor;
  memory in electronic communication with the at least one processor; and
  instructions stored in the memory, the instructions being executable by the at least one processor to:
    receive a plurality of change event identifiers associated with a plurality of change events across multiple hierarchical layers of a hierarchical structure of a cloud computing system;
    maintain a record of failure events across the multiple hierarchical layers of the cloud computing system, the record of failure events including batch entries indicating counts of detected failure events over durations of time;
    identify a failure anomaly within the record of failure events based on a count of detected failure events from a batch entry exceeding a threshold count of failure events of an associated failure event type over a duration of time;
    selectively analyze a subset of change event identifiers from the plurality of change event identifiers over the duration of time associated with the failure anomaly to determine a correlation between at least one change event and the failure anomaly, the subset of change event identifiers being associated with change events detected across at least two of the multiple hierarchical layers of the hierarchical structure of the cloud computing system; and
    generate a recommendation based on the determined correlation between the at least one change event and the failure anomaly.

18. The system of claim 17, wherein the plurality of change events include a plurality of component upgrades on cloud components implemented across multiple hierarchical layers of the hierarchical structure of the cloud computing system.

19. The system of claim 17, wherein the multiple hierarchical layers include two different computing locations, the two different computing locations including two or more of:
  a computing region;
  a computing zone;
  a node cluster;
  a server rack; and
  a server node.

20. The system of claim 17, wherein the threshold count is a threshold sigma value indicating a threshold standard deviation relative to an expected count of failures for the associated failure event.

* * * * *